Sept. 22, 1953  E. C. HARTWIG ET AL  2,653,209
ELECTRONIC TIMER
Filed Aug. 19, 1950
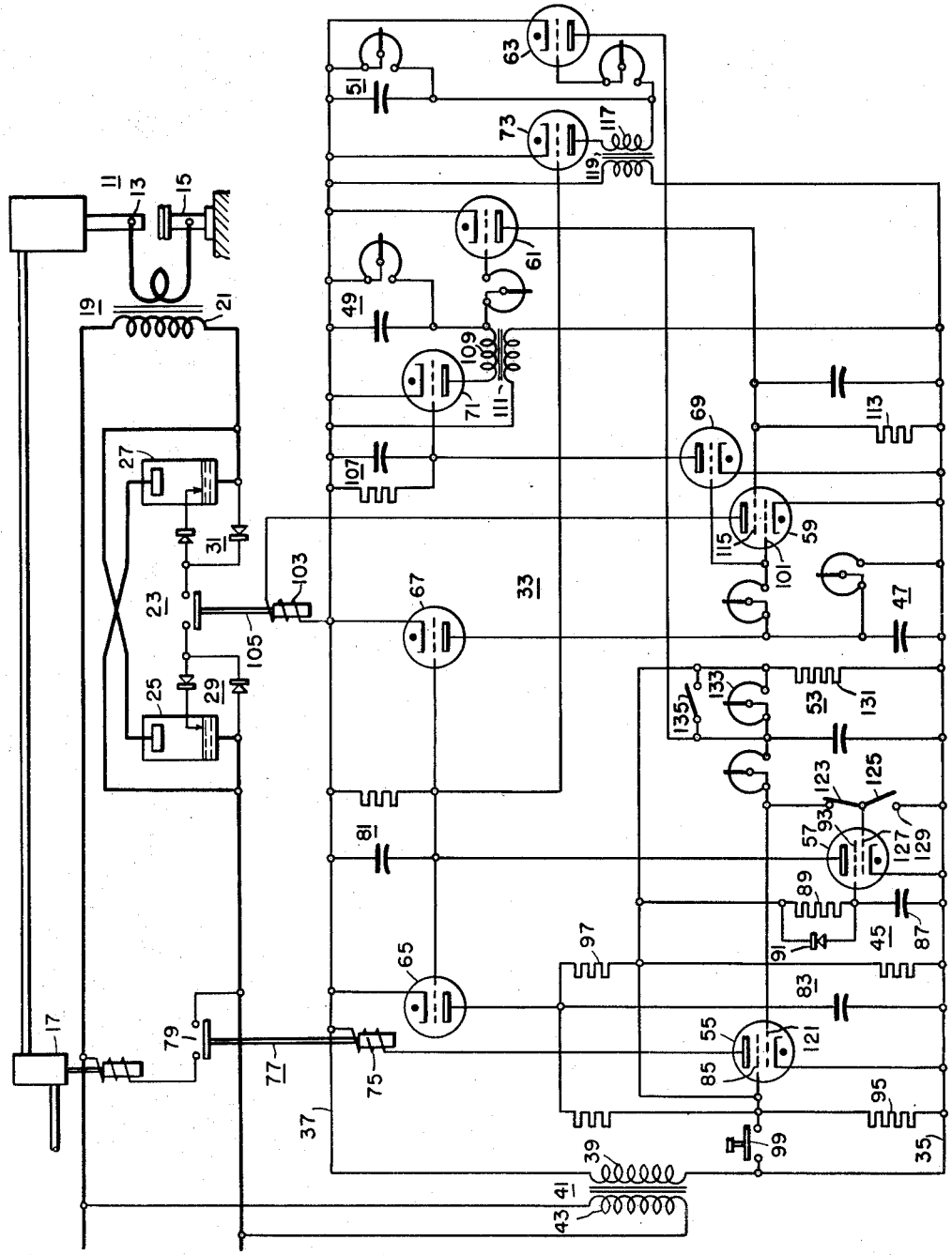
WITNESSES:
INVENTORS
Edward C. Hartwig and
Hubert W. Van Ness.
BY
ATTORNEY Patented Sept. 22, 1953

2,653,209

UNITED STATES PATENT OFFICE 2,653,209

ELECTRONIC TIMER

Edward C. Hartwig, Lancaster, and Hubert W. Van Ness, Buffalo, N. Y., assignors to Westinghouse Electric Corporation, East Pittsburgh, Pa., a corporation of Pennsylvania Application August 19, 1950, Serial No. 180,366

18 Claims. (Cl. 219—4)

Our invention relates to electronic timers and has particular relation to electronic sequence timers for use in resistance welding systems of the type designed to produce spot welds at a high rate of speed.

Resistance welding systems conventionally include a sequence timer comprising a plurality of individual timers which operate in sequence to perform the various functions required for a complete welding operation. In a spot welding system there are four essential functions which require precise timing. These are the functions of squeeze, weld, hold and off. The squeeze timer determines the time interval between the closing of the start switch of the welder and the initiation of the flow of welding current. The weld timer determines the time interval during which welding current flows. The hold timer determines the time interval between the termination of welding current flow and the instant when the welding electrodes are signaled to open. The off timer determines the time interval between the end of the hold time and initiation of a new welding operation. In this interval the off timer operates to reset the welding system for a new operation following each complete weld.

Before a high speed welding operation starts, the welding electrodes are at rest, spaced a substantial distance. Between weld intervals during a high speed operation, the electrodes have time to separate only to a substantially shorter distance during the short off intervals. The squeeze timer is set for this shorter distance, and it initiates current flow through the welding electrodes soon after they are closed. If the initial squeeze time is made the same as the squeeze time between welds during a welding operation, the welding current will flow through the welding electrodes before they close for the initial weld, and the resulting arc between the movable electrode and the material produces a burned spot rather than a fused spot.

It has been found desirable, therefore, to provide some means for making the squeeze time for the initial weld correspondingly longer than for subsequent welds of a series. In the prior art of which we are aware, various schemes have been proposed for accomplishing this object. For example, in one scheme, separate relays are provided for actuating the squeeze timer at the beginning of the welding operation and between welds during a welding operation. In another scheme, a separate timing mechanism such as a thermal timer has been provided for timing the first squeeze interval. After the first weld this mechanism is shunted by relay contacts and the squeeze interval is initiated by a relay actuated by the off timer.

These prior art arrangements we have found to be on the whole satisfactory. However, recent developments in the field of high speed spot welding have brought forth wholly electronic sequence timers which are devoid of electromagnetic relays. Such purely electronic sequence timers are capable of higher speeds and greater precision than those of the type utilizing electromagnetic relays. It is consequently desirable that the means for providing delayed initial squeeze time should also be purely electronic.

It is, accordingly, an object of our invention to provide a purely electronic sequence timer which shall include an initial squeeze delay means.

Another object of our invention is to provide an electronic squeeze delay means for use in an electronic sequence timer.

Another object of our invention is to provide an improved squeeze delay means which is simple in construction and reliable in operation.

It is a further object of our invention to provide an electronic squeeze delay means which shall utilize standard low cost electrical components.

In accordance with our invention, briefly stated, we provide an initial squeeze delay means comprising a time constant network connected in the grid circuit of an electric discharge device. A capacitor in the time constant network is charged through a rectifier from an alternating current source to produce cut-off bias on the discharge device. The time constant network is connected to a high resistance discharge path which is shunted by the contacts of a switch. This switch is closed to start operation of the sequence timer and remains closed during the desired series of welding sequences. Closure of the switch shunts the charging supply to the time constant network and allows the network to begin timing out. When the network has timed out, the discharge device becomes conductive and energizes the normal squeeze timing means. The initial squeeze delay circuit is not operative for subsequent timing sequences because it remains shunted by the contacts of the sequence timer operating switch.

The novel features that we consider characteristic of our invention are set forth with particularity in the appended claims. The invention itself, however, both as to its organization and its method of operation together with additional objects and advantages thereof will be best understood from the following description of a specific embodiment when read in connection with the accompanying drawing, in which the single figure is a diagrammatic view of a preferred embodiment of our invention.

The apparatus shown in the drawing comprises a welding gun 11 having a pair of relatively movable electrodes 13 and 15, respectively. The material to be welded is disposed between the lower electrode 15, and the upper electrode 13 is moved into engagement with the work hydraulically by compressed air or other fluid. The pressure of the fluid is controlled by a solenoid 17. The welding electrodes are connected across the secondary of a welding transformer 19. The primary 21 of the transformer is supplied from an alternating current source (not shown) through a contactor 23 which, in accordance with the preferred practice of our invention, is of the electronic type. The latter comprises a pair of ignitrons 25, 27 connected inversely in parallel between one terminal of the source and the load. Firing current for these ignitrons is supplied through rectifier networks 29, 31.

The ignitron contactor 23 shown is one of a number of this type which may be utilized in the parctice of our invention. For example, an ignitron contactor having a thyratron firing network which includes heat control functions may be utilized.

The operation of the welder 11 and the solenoid 17 and the contactor 23 are controlled by an electronic sequence timer 33. Power is supplied to the sequence timer from auxiliary buses 35, 37 connected across the secondary 39 of a transformer 41 whose primary winding 43 is connected across the power supply buses. The electronic sequence timer 33 comprises five time constant networks 45, 47, 49, 51, 53 for timing the intervals, squeeze delay, squeeze, weld, electrodes closed and off, respectively. The sequence timer also includes five operating tubes 55, 57, 59, 61, 63 which shall be hereinafter designated initiate and off, squeeze delay and off, squeeze, weld and electrodes closed, respectively. The sequence timer further includes five auxiliary tubes 65, 67, 69, 71, 73 which shall be hereinafter designated first, second, third, fourth and fifth auxiliary tubes, respectively. The initiate and off, squeeze delay and off, and squeeze tubes 55, 57, 59 are tetrodes, each having two control electrodes, while the remainder of the tubes are triodes, each having one control electrode. All tubes are preferably of the thyratron type. The initiate and off tube 55 has its cathode connected to the first auxiliary bus 35 and its anode connected through the operating coil 75 of the start relay 77 to the second auxiliary bus 37. The start relay 77 has a pair of normally open contacts 79 in series with the operating coil of the hydraulic control solenoid 17. The cathode of the squeeze delay and off tube 57 is connected to the first auxiliary bus 35 and its anode is connected in series with a first bias network 81, comprising a paralleled resistor and capacitor, to the second auxiliary bus 37. A second bias network 83, comprising a capacitor in parallel with a resistance is connected between a first control element 85 of the initiate and off tube 55 and the first auxiliary bus 35. The squeeze delay timer circuit 45 comprises a capacitor 87 connected in series with a resistor 89 which is shunted by a rectifier 91, preferably of the dry type. One terminal of the capacitor 87 is connected to the first auxiliary bus 35 and the other terminal is connected to the negative terminal of the rectifier 91 and to a first control electrode 93 of the squeeze delay and off tube 57. The positive terminal of the rectifier 91 is connected through a first resistance 95 to the first auxiliary bus 35 and through a second resistance 97 to the anode of the first auxiliary tube 65 whose cathode is connected to the second auxiliary bus 37. The positive terminal of the rectifier 91 and the first control electrode 85 of the initiate and off tube 55 are connected through normally open contacts of the operating switch 99 to the first auxiliary bus 35. The negative terminal of the first bias network 81 is connected to the control electrodes of the first, second and fifth auxiliary tubes 65, 67, 73. The cathode of the second auxiliary tube 67 is connected to the second auxiliary bus 37 and its anode is connected in series with the squeeze time network 47 to the first auxiliary bus 35. The negative terminal of the squeeze time network 47 is connected through appropriate resistance to a first control electrode 101 of the squeeze tube 59 and the control electrode of the third auxiliary tube 69. The cathode of the squeeze tube 59 is connected to the first auxiliary bus 35 and its anode is connected in series with the operating coil 103 of the contactor relay 105 to the second auxiliary bus 37. The cathode of the third auxiliary tube 69 is connected to the first auxiliary bus 35 and its anode is connected in series with a third bias network 107 to the second auxiliary bus 37. The negative terminal of the third bias network 107 is connected to the control electrode of the fourth auxiliary tube 71. The cathode of the fourtth auxiliary tube is connected to the second auxiliary bus 37 and its anode is connected in series with the secondary winding 109 of an anode supply transformer 111 and the weld time network 49 to the second auxiliary bus 37. The negative terminal of the weld time network 49 is connected through appropriate resistance to the control electrode of the weld tube 61. The cathode of the weld tube 61 is connected to the second auxiliary bus 37 and its anode is connected in series with a fourth bias network 113 to the first auxiliary bus 35. The negative terminal of the fourth bias network 113 is connected to the second control electrode 115 of the squeeze tube 59. The cathode of the fifth auxiliary tube 73 is connected to the second auxiliary bus 37 and its anode is connected in series with the secondary winding 117 of an anode supply transformer 119 and the electrodes closed time network 51 to the second auxiliary bus 37. The negative terminal of the electrodes closed time network 51 is connected through an appropriate resistance to the control electrode of the electrodes closed tube 63. The cathode of the electrodes closed tube is connected to the second auxiliary bus 37 and its anode is connected in series with the off time network 53 to the first auxiliary bus 35. The negative terminal of the off time network 53 is connected through an appropriate resistance to the second control electrode 121 of the initiate and off tube 55 and through one set of contacts 123 of a two-position switch 125 to the second control electrode 127 of the squeeze delay and off tube 57. The second control electrode 127 of the squeeze delay and off tube 57 is connected through the other set of contacts 129 of the two position switch 125 to the first auixiliary bus 35. All of the aforesaid bias networks comprise a capacitor in parallel with a resistor. The timing networks, other than the squeeze delay network 45, each comprise a capacitor in parallel with a potentiometer. The off time network 53 includes a resistance 131 in series with its potentiometer 133 and a switch 135 for shunting the potentiometer 133 when desired, as will be hereinafter more fully explained.

Turning now to the operation of our system, assume that the power supply buses are energized and the switches 125, 135 are set for repeat operation, that is the contacts 123 of the two position switch 125 are closed to connect the second control grid 127 of the squeeze delay and off tube 57 to the negative terminal of the off time network 53, and the off time network potentiometer 133 is not shunted by the switch 135. Under these conditions the first, second, fourth and fifth auxiliary tubes 65, 67, 71, 73 are conductive and the remainder of the tubes are non-conductive. A welding operation is initiated by closing the operating switch 99. The first control electrode 85 of the initiate and off tube 55 is connected directly to the cathode through the operating switch contacts 99, so that the negative bias furnished by the second bias network 83 is rendered ineffective and the initiate and off tube 55 becomes immediately conductive. The operating coil 75 of the start relay 77 is energized responsive to conduction of the initiate and off tube 55 and the contacts 79 of the start relay 77 close the energizing circuit of the hydraulic control solenoid 17 to close the welding electrodes 13, 15. Closing of the operating switch 99 also connects the positive terminal of the rectifier 91 in the squeeze delay network 45 directly to the positive terminal of the capacitor 87 in that network so the capacitor 87 begins to discharge. After the desired squeeze delay interval, determined by the magnitude of the resistor 89 in the squeeze delay network 45, the capacitor 87 has discharged sufficiently to remove the negative bias from the first control electrode 93 of the squeeze delay and off tube 57 and that tube becomes conductive. Current through the squeeze delay and off tube 57 charges the first bias network 81 to render the first, second and fifth auxiliary tubes 65, 67, 73 non-conductive. Since the fifth auxiliary tube 73 is non-conductive, charging current to the electrodes closed time network 51 ceases, and that network begins to time out. Since the second auxiliary tube 67 is non-conductive, charging current to the squeeze time network 47 ceases and that network begins to time out. Timing out of the squeeze time network 47 removes the negative bias from the first control electrode 101 of the squeeze tube 59 and the control electrode of the third auxiliary tube 69. The squeeze tube 59 is then rendered conductive to energize the operating coil 103 of the contactor relay 105 to close the ignitron firing circuits 29, 31 and initiate welding current flow. Current from the third auxiliary tube 69 charges the third bias network 107 to cut-off the fourth auxiliary tube 71 so that charging current to the weld time network 49 ceases, and the weld time network 49 starts timing out. At the end of the weld time, the weld tube 61 is rendered conductive to charge the fourth bias network 113. The fourth bias network 113 then places a negative bias on the second control electrode 115 of the squeeze tube 59 to render the squeeze tube non-conductive and deenergize the operating coil 103 of the contactor relay 105 to stop welding current flow. After an interval sufficient for the desired hold time the electrodes closed time network 51 completes its timing out process and the electrodes closed tube 63 is rendered conductive to charge the off time network 53. Charging of the off time network 53 establishes a negative bias on the second control electrode 121 of the initiate and off tube 55 to render it non-conductive and deenergize the operating coil 75 of the start relay 77 to open the welding electrodes 13, 15. Since the two-position switch 125 is set for repeat operation, a negative bias is also established by the off time network 53 on the second control electrode 127 of the squeeze delay and off tube 57 to render that tube non-conductive. Charging current to the first bias network 81 from the squeeze delay and off tube 57 then ceases, and the first, second and fifth auxiliary tubes 65, 67, 73 are immediately rendered conductive. Since the operating switch 99 is held closed for repeat operation, charging of the second bias network 83 is ineffective to cut off the initiate and off tube 55. For the same reason, conduction of the first auxiliary tube 65 does not recharge the squeeze delay network 45 and, therefore, that network is now ineffective. The second auxiliary tube 67 conducts to recharge the squeeze time network 47 to establish negative bias on the squeeze tube 59 and the third auxiliary tube 69. The third auxiliary tube 69 becomes immediately non-conductive to remove the bias furnished by the third bias network 107 to the control electrode of the fourth auxiliary tube 71. The fourth auxiliary tube 71 then is rendered conductive to charge the weld time network 49. Meanwhile the fifth auxiliary tube 73 becomes conductive to charge the electrodes closed time network 51. Charging of the electrodes closed time network 51 cuts off the electrodes closed tube 63 and charging current to the off time network 53 ceases. Since the unit is set for repeat operation, the potentiometer 133 in the off time network 53 is not shunted by the switch 135, and the off time network 53 beings its timing out process. At the end of the off time, the negative bias is removed from the second control electrode 121 of the initiate and off tube 55. This tube immediately conducts to energize the start relay 77 to close the welding electrodes 13, 15 for the next welding sequence. At the same time, negative bias is removed from the second control electrode 127 of the squeeze delay and off tube 57 and that tube is rendered immediately conductive to charge the first bias network 81. Charging of the first bias network 81 then cuts off the first, second and fifth auxiliary tubes 65, 67, 73. As stated above, since the operating switch 99 is maintained closed, the first auxiliary tube 65, together with the second bias network 83 and the squeeze delay network 45, are no longer effective in the circuit. Cutting off the second auxiliary tube 67 stops charging current to the squeeze time network 47 and that network starts its timing out process. It is now apparent that the squeeze time for the second, and subsequent welding sequences, is determined entirely by the squeeze time network 47. The squeeze delay network 45 is effective only for the first welding sequence. Cutting off the fifth auxiliary tube 73 stops charging of the electrodes closed time network 51 and that network immediately starts its timing out process. The sequence then continues as described above to complete the second welding sequence and as many subsequent welding sequences as are desired so long as the operating switch 99 is maintained closed.

If non-repeat operation is desired, the two-position switch 125 is set in the non-repeat position, that is, so that the second control electrode 127 of the sequence delay and off tube 57 is connected to its cathode and the off time potentiometer shunt switch 135 is closed. Under these conditions when the electrodes closed tube 63 becomes conductive at the end of the desired hold time, the off time network 53 is charged and a negative bias is placed on the second control electrode 121 of the initiate and off tube 55 to render that tube non-conductive, deenergize the start relay 77 and open the welding electrodes 13, 15. However, the negative bias furnished by the off time network 53 is not placed on the second control electrode 127 of the squeeze delay and off tube 57, so that tube continues to be conductive. Consequently, the sequence timer does not automatically reset, and no further action takes place.

Although we have shown and described a specific embodiment of our invention, we are aware that some modifications may be made without departing from the scope of our invention. We desire, therefore, to be restricted only insofar as is necessitated by the prior art and the spirit of the appended claims.

We claim as our invention:

1. The combination comprising an electric discharge device having an anode, a cathode, and a control electrode, a time constant network connected in series with said control electrode, means connected to energize said network to establish a cut-off bias on said control electrode, and means for shunting said network to render said control electrode ineffective after the period of time determined by said network, and for as long as said portion of said network remains shunted.

2. The combination comprising an electric discharge device having an anode, a cathode, and first and second control electrodes, means connected to supply anode voltage to said discharge device, a capacitor connected between said first control electrode and said cathode, means providing a discharge path connected in shunt with said capacitor, means connected to supply charging current to said capacitor in a sense to establish a cut-off bias on said first control electrode, and means for thereafter shunting such portion of said discharge means as will cause said capacitor to discharge at the desired rate to establish a time interval after which said cut-off bias is removed and said discharge device is susceptible to control by said second control electrode.

3. An electronic sequence timer, first and second load devices to be energized by operation of said sequence timer, said sequence timer comprising means for establishing a first predetermined interval of time between energization of said load devices for the first sequence of operation, and a second predetermined interval of time between energization of said load devices for subsequent sequences of operation, said second interval of time to be smaller than the first, said last mentioned means including first and second time constant networks, each said time constant network including a resistance in series with a capacitor, means for charging said capacitors, means to initiate operation of said first time constant network by shunting a portion of its resistance to remove its charging potential, means for maintaining said shunting for the duration of the sequence series, and means responsive to timing out of said first network to initiate operation of said second network by interrupting its source of charging potential.

4. An electric discharge device having an anode, a cathode, and a control electrode, a series circuit comprising a capacitor, a first resistance shunted by a first rectifier the positive terminal of which is connected to said capacitor, and a second resistance shunted by normally open contacts, first and second terminals for connection to a source of alternating potential, a second rectifier, conductors connecting the negative terminal of said second rectifier to said second terminal, the positive terminal of said second rectifier to the negative terminal of said first rectifier, the positive terminal of said first rectifier to the control electrode of said discharge device, and the junction of said second resistor and said capacitor to the cathode of said discharge device and to said first terminal.

5. The invention in accordance with claim 4, characterized by the fact that said first rectifier is of the dry type and said second rectifier is an electric discharge device.

6. First and second electric discharge devices each having an anode, a cathode and a control electrode, first and second terminals for connection to an alternating potential source, a rectifier, a first capacitor, a second capacitor, a resistance, conductors connecting the cathode of said discharge devices and one terminal of each of said capacitors to said first terminal, conductors connecting the other terminal of said first capacitor to the control electrode of said first discharge device and the other terminal of said second capacitor to the control electrode of said second discharge device, conductors connecting said resistance between said control electrodes, conductors connecting the positive terminal of said rectifier to the control electrode of said first discharge device and the negative terminal of said rectifier to said second terminal, normally open contacts connected between the control electrode of said first discharge device and said first terminal and means for closing said contacts, whereby said first discharge device is immediately rendered conductive, and said second discharge device is rendered conductive after an interval of time determined by the magnitude of said resistance.

7. First and second electric discharge devices each having an anode, a cathode and a control electrode, first and second terminals for connection to an alternating potential source, first and second rectifiers, a first capacitor, a second capacitor, a resistance, conductors connecting the cathode of said discharge devices and one terminal of each of said capacitors to said first terminal, conductors connecting the other terminal of said first capacitor to the control electrode of said first discharge device and the other terminal of said second capacitor to the control electrode of said second discharge device, conductors connecting said resistance between said control electrodes, conductors connecting said first rectifier in shunt with said resistance, the positive terminal of said first rectifier being connected to the control electrode of said second discharge device, conductors connecting the positive terminal of said second rectifier to the control electrode or said first discharge device and the negative terminal of said second rectifier to said second terminal, normally open contacts connected between the control electrode of said first discharge device and said first terminal, and means for closing said contacts, whereby said first discharge device is immediately rendered conductive, and said second discharge device is rendered conductive after an interval of time determined by the magnitude of said resistance.

8. In combination, a time constant network consisting of a timing resistor and a capacitor, a rectifier shunting said resistors, a pair of terminals for supplying a potential, means for connecting said terminals in series with said rectifier-resistor network and said capacitor whereby said capacitor is adapted to be charged through said rectifier to one polarity and means actuable by an operator for connecting a low-resistance shunt across said terminals whereby said capacitor is discharged through said resistor.

9. In combination, an electric discharge device having an anode, a cathode and a control electrode; a capacitor connected between said control electrode and said cathode; a pair of terminals for supplying a potential, one of said terminals being connected to said cathode; a timing resistor connected between the other terminal and said control electrodes; a rectifier shunting said resistor and low-resistance means for shunting said terminals.

10. A sequence timer for controlling high speed operation of a welder having a pair of welding electrodes, means for moving said electrodes into and out of engagement with work, and means for supplying welding current through said electrodes to said work, characterized by a squeeze network for determining the time interval between the engagement of said electrodes and said work and the supply of said welding current, said network including a first capacitor shunted by a first timing resistor; a first electric discharge device for charging said capacitor, said device being adapted to be conductive at the beginning of a welding operation; a closed-time network for determining the time during which said electrodes remain in engagement with the work including a second capacitor shunted by a second timing resistor; a second electric discharge device for charging said second capacitor, said second device being adapted to be conductive at the beginning of a welding operation; and means for rendering said first and second devices non-conductive simultaneously at predetermined time intervals after the welding operation is started.

11. In combination, a first electric discharge device having an anode, a cathode, a first control electrode and a second control electrode; a second electric discharge device having an anode, a cathode, a first control electrode and a second control electrode; a first capacitor-resistor network connected between the control electrode and the cathode of said first device; a second capacitor-resistor network connected between the first control electrode and the cathode of said second device; and a third capacitor-resistor network connected between the second control electrodes and the cathodes of both said devices.

12. In combination, a first electric discharge device having an anode, a cathode, a first control electrode and a second control electrode; a second electric discharge device having an anode, a cathode, a first control electrode and a second control electrode; a first capacitor-resistor network connected between the control electrode and the cathode of said first device; a second capacitor-resistor network connected between the first control electrode and the cathode of said second device; a third capacitor-resistor network connected between the second control electrodes and the cathodes of both said devices; means adapted to maintain the capacitors of said first and second networks charged; and means adapted to maintain the capacitor of said third network initially uncharged and to charge said last-named capacitor responsive to the conductivity of said second device.

13. A squeeze timer according to claim 10, characterized by a "weld" network, for determining the duration of the welding current, including a third capacitor shunted by a third timing resistor; a third electric discharge device for charging said third capacitor, said third device being adapted to be conductive at the beginning of a weld; and means for rendering said third device non-conductive a predetermined time interval, as determined by the squeeze network, after said first device has been rendered non-conductive.

14. A sequence timer for controlling high-speed operation of a welder having a pair of welding electrodes, means for moving said electrodes into and out of engagement with work, and means for supplying welding current through said electrodes to said work, characterized by a squeeze time-constant network for determining the time interval between the engagement of the welding electrode with the work and the starting of current flow through the work, said squeeze network including energy storage means and means for discharging said storage means; a first electric discharge device for controlling the charging of said storage means, said device being capable of being maintained either in a conductive or non-conductive condition and being adapted to be maintained in one of said conditions at the beginning of a welding operation whereby said energy storage means is maintained charged; a closed-time network for determining the time during which said electrodes remain in engagement with the work, said network including second energy storage means and second means for discharging said second energy storage means; a second electric discharge device for controlling the charging of said second energy storage means, said second device being capable of being maintained either in a conductive or non-conductive condition and being adapted to be maintained in one of said conditions at the beginning of a welding operation whereby said second energy storage means is maintained charged; and means for changing the condition of said first and second devices simultaneously, a predetermined time interval after the welding operation is started.

15. Apparatus for controlling a welder having a pair of welding electrodes, means for urging said electrodes into engagement with work under pressure and means for supplying current to weld said work comprising in combination a first electric discharge device having an anode, a cathode and a control electrode; means for connecting said anode and cathode in circuit with said urging means so that said urging means is actuated when said discharge device is conductive; means connected to said control electrode for initiating the conduction of said discharge device; a second electric discharge device having an anode, a cathode and a control electrode; means for connecting said last-named anode to said control electrode for initiating the conduction of said discharge device; a second electric discharge device having an anode, a cathode and a control electrode; means for connecting said last-named anode and cathode to said current supply means so that said current supply means is actuated when said second device is conductive; a first timing network connected to the control electrode of said second device, said network when in timing condition permitting said second device to conduct only after it times out; means for maintaining said network in timing condition and for preventing it from timing out in the standby condition of said apparatus; a third electric discharge device having an anode, a cathode and a control electrode; means for connecting said last-named anode and cathode in circuit with said maintaining means so that said maintaining means is actuated to permit said network to time out when said third device is conductive; a second timing network in circuit with the control electrode of said third device, said second network when in timing condition permitting said third device to conduct only after it times out; means for maintaining said second network in timing condition and preventing it from timing out in the standby condition of said apparatus; and means actuable by said initiating means for actuating said last-named maintaining means to permit said second network to time out for a first of a series of welds and thereafter to prevent said maintaining means from resetting it in timing condition during the subsequent ones of said series of welds.

16. In combination, an electric discharge device having an anode, a cathode, a first control electrode and a second control electrode; a first timing network including energy-storage means and means for discharging said storage means connected between said first control electrode and said cathode; a second timing network including energy-storage means and means for discharging said last-named storage means connected between said second control electrode and said cathode; means for charging the energy-storage means of said first network; means for charging the energy-storage means of said second network; and a manual switch to short out said last-named charging means.

17. A sequence timer for controlling high-speed operation of a welder having a pair of welding electrodes, means for moving said electrodes into and out of engagement with work, and means for supplying welding current through said electrodes to said work, characterized by a squeeze network for determining the time interval between the engagement of said electrodes and said work and the supply of said welding current, said network including a first capacitor shunted by a first timing resistor; means for charging said capacitor, said charging means operating to maintain said capacitor charged at the beginning of a welding operation; a closed-time network for determining the time during which said electrodes remain in engagement with the work including a second capacitor shunted by a second timing resistor; means for charging said second capacitor, said last-named charging means operating to maintain said second capacitor charged at the beginning of a welding operation; and means for interrupting the charging of both said capacitors simultaneously at predetermined time intervals after the welding operation is started.

18. A sequence timer for controlling high-speed operation of a welder having a pair of welding electrodes, means for moving said electrodes into and out of engagement with work, and means for supplying welding current through said electrodes to said work, characterized by a squeeze network for determining the time interval between the engagement of said electrodes and said work and the supply of said welding current, said network including a first capacitor in circuit with a first timing resistor; means for charging said capacitor, said charging means operating to maintain said capacitor charged at the beginning of a welding operation; a closed-time network for determining the time during which said electrodes remain in engagement with the work including a second capacitor in circuit with a second timing resistor; means for charging said second capacitor, said last-named charging means operating to maintain said second capacitor charged at the beginning of a welding operation; and means for interrupting the charging of both said capacitors simultaneously at predetermined time intervals after the welding operation is started.

EDWARD C. HARTWIG.
HUBERT W. VAN NESS.

References Cited in the file of this patent

UNITED STATES PATENTS

| Number | Name | Date |
| --- | --- | --- |
| 2,146,889 | Franke | Feb. 14, 1939 |
| 2,306,791 | Moe | Dec. 29, 1942 |
| 2,354,140 | Pearson | July 18, 1944 |
| 2,390,981 | Bivens | Dec. 18, 1945 |
| 2,404,643 | Livingston | July 23, 1946 |
| 2,532,111 | Longini | Nov. 28, 1950 |
| 2,573,360 | Rockafellow | Oct. 30, 1951 |
| 2,574,939 | Stanback | Nov. 13, 1951 |